Feb. 17, 1925.
C. H. WILLIAMS
1,527,100
DEVICE FOR TEACHING TOUCH TYPEWRITING
Filed Sept. 20, 1919
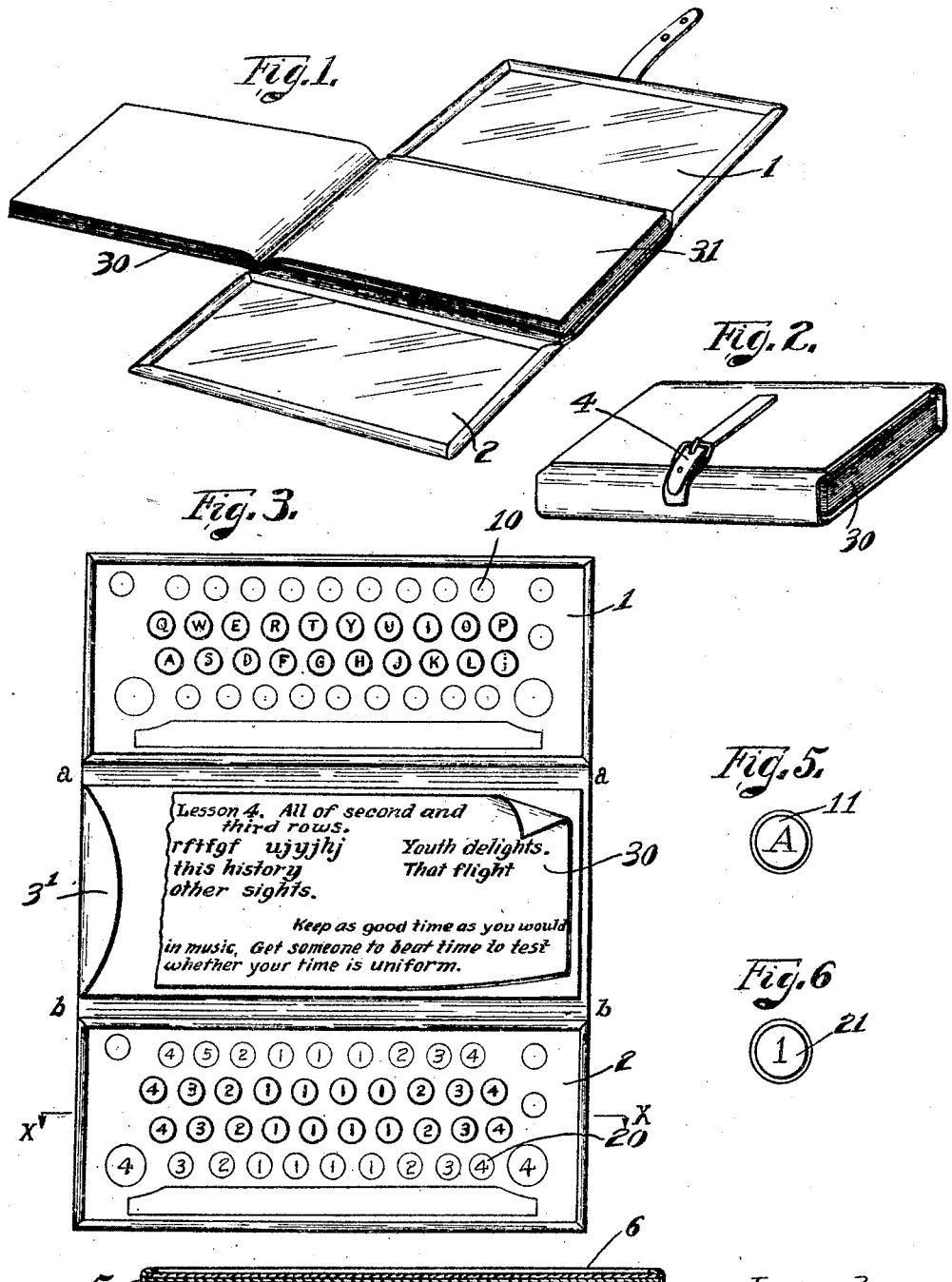
Inventor
Clara H. Williams
By [signature]
Attorney Patented Feb. 17, 1925.

1,527,100

UNITED STATES PATENT OFFICE.

CLARA H. WILLIAMS, OF SUTTON, MASSACHUSETTS.

DEVICE FOR TEACHING TOUCH TYPEWRITING.

Application filed September 20, 1919. Serial No. 325,134.

*To all whom it may concern:*

Be it known that I, CLARA H. WILLIAMS, a citizen of the United States, residing at Sutton, county of Worcester, Commonwealth of Massachusetts, have invented certain new and useful Improvements in Devices for Teaching Touch Typewriting, of which the following is a specification.

My present invention relates to teaching, and particularly to a device for the teaching and practice of touch typewriting. The manipulation of a typewriting machine without eye guidance for the fingers has been in constantly increasing demand as a necessary element to speed and accuracy. It has heretofore been a somewhat difficult accomplishment except among professional typists who by long study and constant practice have acquired the necessary muscular memory of the key board of their machine and who have built up thereon the requisite digital agility for speed.

Such training has moreover been for the most part confined to schools where practice typewriting machines and instructions or coaches are available. Such schools are not available to all and study at such schools is usually only possible for those definitely committed to a career as a professional. Even to those anxious to enter such schools the required time and expense and opportunity are not always at the command of the worthy.

More than this the general utility of the typewriting machine is so far greater than mere professional employment that it is of the greatest importance to make available to all, the most complete mastery of the typewriter as a general factor in our civilization.

It is the purpose of my present invention to make available to all in a series of related steps an absolute knowledge of touch typewriting without the use of a typewriting machine for mastery of the step which the pupil is learning. In fact, my system does not contemplate the use of a machine in learning except to rehearse or demonstrate the lessons as they are learned. The use of the machine is of course to be encouraged for the development of speed and as a stimulus and encouragement to the pupil who thus has the satisfaction of noting his own progress.

My invention contemplates a combination in which the mind through the eye and the fingers by movement are simultaneously but independently drilled to effect muscular memory which will compel accurate and immediate digital response on the keys of a typewriter.

For this I provide an eye chart and an exercise area with proper digit loci capable of a graded, progressive expansion so that each digit is trained and experienced both independently and in combination with other fingers in widening key areas following lessons of selected and predetermined character sequence.

My invention is capable of a considerable variety of mechanical embodiments. For the purpose of illustration I have shown a form well adapted to average usage. In the drawings illustrating this form reference characters are appended in correspondence to those used throughout the specification.

In these drawings:

Fig. 1 is a view of an embodiment characteristic of my invention and ready for use.

Fig. 2 a view of the same packed.

Fig. 3 a plan view of the layout of a lesson.

Fig. 4 is a section on the line X—X, and

Figs. 5 and 6 details of characteristic loci markers.

In the practice of my invention I provide a visualization area 1 adapted to receive at suitably indicated points 10 the proper character discs 11 which will be hereinafter described.

The points 10 at which the character discs 11 are to be applied may for the purposes of this application be considered merely as loci or indicated positions. The indications may be made in any manner desired, but these loci are perfectly definite in that they include all those relative positions corresponding to the keys and the key board of any given typewriter, the manipulation of which is to be taught.

Associated with this is an exercise area 2 having indicated loci 20 on which are to be located proper wafers 21 as will be more fully explained later. Between these areas and preferably spacing them apart I provide a lesson area 3 at which may be located a sheet or page 30 which in the form shown may be a page of a book 31.

The sheets or pages 30 each have in whole or in part one of a series of lessons which furnish instructive or practice matter such as words or letter combinations, the characters of which are to be set up in the visualization space 1 by the application of the wafers 11. The corresponding wafers 21 are applied to the practice area 2. The pupil then follows the words or character combinations by placing the fingers or moving the fingers among the wafers 21 in the same manner that would be carried out in striking the keys on the machine.

For example, the lesson of the progressive series of the book 31 shown in Fig. 3 might be as follows:

Lesson 4. All of second and third rows.

rftfgf ujyjhj     Youth delights.
this history     That flight.
other sights

Keep as good time as you would in music. Get someone to beat time to test whether your time is uniform.

The preceding lesson from which such a lesson was expanded might have been as follows: Lesson 3. Second and third rows. Outer keys.

*Lesson 3.* aqweraf ; juiop;j     desired dollars.
required   flukes     liked fellows.
frewqaf   ;poiuj;
owes    apples.

When you can do this lesson with correct fingering and accuracy in reaching the keys, your faith in your ability to master the subject will be unbounded.

The term "loci" applied to the indicated points 20 on the exercise area 8 is used for the reasons set forth above in connection with the points or positions 10. These indicated loci 20 have the same relative positions as 10 and in fact are a duplication as far as position is concerned. The difference between the two groups is this. The loci 10 are preferably unlettered or uncharactered inasmuch as it is desirable in the visualization area to avoid distraction of attention from anything except the indicted key group which is to be kept before the mind of the pupil at any particular lesson. The term "character" as used herein is intended to mean the character or marking of any key as distinguished from the finger indications 1, 2, 3, 4, which direct the pupil as to the proper finger to be used on the key.

I preferably form the areas 1, 2 and 3 as a flexibly jointed board hinged along the lines $a$—$a$ and $b$—$b$. The area 3 in the form shown is formed with a pocket $3^1$ into which the rear cover of the book 31 may be thrust so that when the book is closed it will overlie the area 3. The portions 1 and 2 may then be folded about the book and secured in any suitable manner as by the strap and buckle 4 as shown in Fig. 2.

In practice the areas 1 and 2 are suitably bound with a facing of celluloid 6 over a sheet 5 on which are defined by printing suitably spaced circles 10 and 20 arranged in rows and corresponding in number and arrangement with the position of the type keys of a typewriter. The circles defining these spaces are preferably lightly defined and are each lightly indicated by the character appearing on the corresponding key of the typewriter key board which is to be used to aid in placing the markers.

In the area 2 the circles 20 are laid out in exactly corresponding manner but the key characters are not indicated thereon. In lieu thereof each circle is marked with a numeral 1, 2, 3, or 4 indicating the proper digit to be used in striking the indicated key.

With each device I supply two sets of wafers 11 and 21. These wafers are very conveniently formed as discs of paper embossed and gummed on their under face. The wafers of the set 11 approximate in size and color the keys of the typewriter and constitute a complete set representing in their entirety all the characters which appear. These constitute the visualization set of my system.

The wafer set 21 is also preferably an embossed reproduction of the key of the machine to be taught but with the key characters omitted. These key wafers, however, are lightly marked with numerals 1, 2, 3, or 4 the same constituting digit indications for assisting in locating or verifying the location of any finger in any position on the bank.

My system contemplates the introduction of the pupil to limited areas of the key bank in progression. Each area is to be learned and thoroughly mastered before the area is to be expanded.

I therefore provide in the lessons furnished a stint consisting of a predetermined number of characters. These characters are selected with regard to the contiguity of the keys as actually occurring on the machine to be taught.

The lessons usually include combinations of these characters arranged to give greatest possible variety in relative finger movement. Whenever possible words are selected having these letter combinations.

In preparing a lesson the pupil locates on the proper circles indicated in the visualization area 1 the proper wafers 11 thus presenting to the eye as a group what is practically a reproduction of that area of the key bank. The pupil therefore has before the eye what is really a reproduction of these keys standing out in relief on the general area of an indicated key board. Thus only those particular keys on which attention is to be concentrated are presented to the eye. This gives to the mind through the eye a strong visual impression which has for the average memory a high persistence with a corresponding high memory efficiency.

On the practice area 2 the pupil locates the corresponding number of digit locus wafers 21, selecting those bearing the proper digit number in correspondence with those indicated on the digit loci 20. This presents to the fingers properly spaced touch elements easily perceptible by the finger tips and constituting definite spots to which the fingers may be moved in accordance with the combination and sequence called for in the lesson.

By the repeated positioning of the fingers on these various loci and with the visual association afforded on the sight area 1 there is rapidly formed the muscular memory required in touch typewriting.

As soon as visual memory has been sufficiently established, the visualization area 1 may be folded under the area 3. As digitation is carried on the muscular memory is rapidly effected and visualization may be gradually discontinued. Where the pupil does not possess a visual memory it is necessary to maintain reference for a longer period to the sight area 1 where it becomes apparent that a pupil does not possess natural visual memory the sight area may be used to develop such a memory or the pupil may be permitted to name the character out loud at the time of movement of the finger if it appears that a pupil has developed auditory memory or that an auditory memory will work to better advantage and afford greater progress.

When the pupil has mastered the given area and has practiced the required digitation sufficiently to be able to accurately and rapidly place the fingers without visual aid to the fingers, i. e. the sight area 1, then the pupil may be placed at the machine for practical test and rehearsal on the lesson just learned.

In practice it is found that it is better to reserve the machine itself for such test and rehearsal until the pupil has actually mastered the lesson and definitely established either a pure muscular memory or such a combination of visual and muscular memories as will enable him to effect an unerring digitation. The reason of this is that the period consumed in memorizing and practicing is apt to become irksome and the promise of transfer to the actual machine affords a promise of change which gives an incentive to complete the drudgery of the lesson. Neither is it to be ignored that if the drudgery can be transferred from the machine to the drilling device, a very practical result has been accomplished in avoiding those feelings of dislike which are apt to be attached to the thing immediately associated with the unpleasant experience. In this connection it may be noted that my system practically accommodates this phase of human nature because no matter how tedious the pupil has found the practice of the lesson on my system, the satisfaction of accomplishment and demonstration on the machine is usually so great that the pupil cheerfully returns to the system and the drudgery of the next lesson inspired by the success of the demonstration on the machine itself of the preceding lesson.

After one lesson has been mastered, demonstrated and rehearsed the next lesson is taken up. Additional character discs 11 are added in accordance with the succeeding lesson and the corresponding digit discs 21 are added on the exercise area 2. The lesson to be studied appears at the area 3 in the form shown, it being simply necessary to turn the leaves.

The lessons are continued, the areas enlarged by attaching new wafers until both the sight area and the exercise area are completely filled, at which time the pupil will have learned the entire key board and can take up practice for speed.

The particular areas or keys selected for each lesson and the sequence of these areas and lessons and the characters and digitation may be varied and probably should be varied especially for different key boards. The nature of the apparatus used is also open to wide variety of use and the lessons themselves may be presented in a variety of forms, the book form being merely employed as illustrative of a convenient and successful form of my invention. All these varieties are within the purview of my invention if within the limits of the appended claims.

What I therefore claim and desire to secure by Letters Patent is:

1. An apparatus for teaching touch typewriting comprising a chart having a visualization area section, and a fingering area section, both of said sections being a simulation of at least a portion of a typewriter keyboard and being substantially counterparts of each other.

2. An apparatus for teaching touch typewriting, comprising a folder having a plurality of sections, one of said sections having a visualization area, and another of said sections having a fingering area, both of said areas being a simulation of at least a portion of a typewriter keyboard and being substantially counterparts of each other.

3. An apparatus for teaching touch typewriting, comprising a chart having a visualization area section which is a simulation of at least a portion of a typewriter keyboard with designating characters indicating the keys represented, and a fingering area section which is a simulation of that portion of the typewriter keyboard simulated by the visualization section with designating characters indicating the digits to be used.

4. An apparatus for teaching touch typewriting comprising a visualization area section which is a simulation of at least a portion of a typewriter keyboard with designating characters indicating the keys represented, a fingering area section which is a simulation of that portion of the typewriter keyboard simulated by the visualization section with designating characters indicating the digits to be used, and progressive exercises associated therewith.

5. In a touch typewriting teaching system, an exercise area having a group of unlettered digit loci indicated at suitable intervals corresponding to typewriter key spacing, each having a proper designation indicating the particular finger of the hand to be used on it, a visualization area containing corresponding key indications having key characters shown thereon, and a set of attachable markers having key characters thereon for the visualization area and a set of attachable digit loci markers having suitable finger numbers thereon for said exercise area.

6. In a touch typewriting teaching system, an exercise area having a group of unlettered digit loci indicated at suitable intervals corresponding to typewriter key spacing, each having a proper designation indicating the particular finger of the hand to be used on it, a visualization area containing corresponding key indications having key characters shown thereon, and progressive lessons comprising practice letter combinations of the letters included in successively corresponding areas of the typewriter keyboard, and a set of attachable markers having key characters thereon for the visualization area and a set of attachable digit loci markers having suitable finger numbers thereon for said exercise area.

7. In a touch typewriting teaching system an exercise area having a group of unlettered digit loci indicated at suitable intervals corresponding to typewriter key spacing, each having a proper designation indicating the particular finger of the hand to be used on it, a visualization area containing corresponding key indications having key characters shown thereon, and progressive lessons comprising practice letter combinations of the letter included in successively corresponding areas of the typewriter keyboard, and a set of gummed wafers having key characters thereon for the visualization area and a set of gummed wafers having suitable finger numbers thereon for said exercise area.

In testimony whereof I affix my signature in presence of two witnesses.

CLARA H. WILLIAMS.

Witnesses:
JOHN J. BASSETT,
J. ROGER PUTNAM.